(12) United States Patent
Lee

(10) Patent No.: US 12,485,569 B2
(45) Date of Patent: Dec. 2, 2025

(54) PROTECTIVE COVER HAVING A QUICK-RELEASE UNIT

(71) Applicant: P & F BROTHER INDUSTRIAL CORPORATION, Taichung (TW)

(72) Inventor: Yu-Shu Lee, Taichung (TW)

(73) Assignee: P & F BROTHER INDUSTRIAL CORPORATION, Taichung (TW)

( * ) Notice: Subject to any disclaimer, the term of this patent is extended or adjusted under 35 U.S.C. 154(b) by 315 days.

(21) Appl. No.: 18/481,006

(22) Filed: Oct. 4, 2023

(65) Prior Publication Data

US 2025/0001643 A1    Jan. 2, 2025

(30) Foreign Application Priority Data

Jun. 30, 2023   (TW) ................................. 112124614

(51) Int. Cl.
 *B27G 19/02* (2006.01)
 *B23D 59/00* (2006.01)
(52) U.S. Cl.
 CPC ........... *B27G 19/02* (2013.01); *B23D 59/006* (2013.01)
(58) Field of Classification Search
 CPC .............................. B23D 59/006; B27G 19/02
 See application file for complete search history.

(56) References Cited

U.S. PATENT DOCUMENTS

| | | | | |
|---|---|---|---|---|
| 9,662,800 B2* | 5/2017 | Carlsson | ................ | B28D 1/045 |
| 10,118,308 B2* | 11/2018 | Gass | ...................... | B27G 19/08 |
| 10,576,561 B2* | 3/2020 | Yu | ......................... | B23D 59/006 |
| 2007/0113714 A1* | 5/2007 | Burke | .................... | B27G 19/02 |
| | | | | 83/477.2 |
| 2007/0113715 A1* | 5/2007 | Burke | .................... | B23D 47/04 |
| | | | | 83/477.2 |
| 2011/0061506 A1* | 3/2011 | Frolov | .................... | B27G 19/08 |
| | | | | 83/477.2 |
| 2012/0159763 A1* | 6/2012 | Chiang | .................. | B27G 19/02 |
| | | | | 403/11 |
| 2012/0216665 A1* | 8/2012 | Gass | ........................ | B27B 5/29 |
| | | | | 83/440.2 |
| 2015/0135923 A1* | 5/2015 | Liao | ....................... | B27G 19/08 |
| | | | | 83/478 |
| 2023/0249376 A1* | 8/2023 | Huang | ................... | B27G 19/02 |
| | | | | 83/478 |
| 2024/0051173 A1* | 2/2024 | Vivona, Jr. | ............ | B27G 19/02 |

* cited by examiner

*Primary Examiner* — Sean M Michalski
(74) *Attorney, Agent, or Firm* — HSML P.C.

(57) ABSTRACT

A protective cover adapted to be mounted on a table saw and includes a base seat, a shell unit, a quick-release unit, and two protective members. The quick-release unit is disposed in the shell unit and includes a main engaging member, an auxiliary engaging member, and a pull member that is connected to the main engaging member. The protective cover is pivotably connected to the shell unit. The pull member is pitovable between a lock position, where the main engaging member and the auxiliary engaging member are connected to the base seat to secure the shell body to the base seat, and a release position, where the main engaging member and the auxiliary engaging member are allowed to be separated from the base seat to thereby allow separation of the shell unit, the quick-release unit and the protective members from the base seat.

10 Claims, 7 Drawing Sheets

PROTECTIVE COVER HAVING A QUICK-RELEASE UNIT

CROSS-REFERENCE TO RELATED APPLICATION

This application claims priority to Taiwanese Invention Patent application Ser. No. 11/212,4614, filed on Jun. 30, 2023, which is incorporated herein by reference in its entirety.

FIELD

The disclosure relates to an accessory in woodworking machinery, and more particularly to a protective cover having a quick-release unit.

BACKGROUND

A conventional woodworking machine, e.g., a table saw, includes a table and a saw blade that extends transversely through a top surface of the table. To prevent wooden chips and sawdust from entering an operator's eyes during a cutting process, a detachable protective cover unit is installed to the table in addition. The protective cover includes a mounting base mounted on the table and proximate to the saw blade, and two protective members connected to the mounting base. To remove the wooden chips and sawdust generated during production, a mounting base with a tubular dust-collecting passage is utilized instead, with one end of the dust-collecting passage facing the saw blade and another end connecting to a suction device which extracts the wooden chips and sawdust.

During production, in response to many different working conditions, such as when a workpiece generates little wooden chips and sawdust, or when cutting speed is low, thereby making the wooden chips and sawdust to be less likely to make a splash, a mounting base without the dust-collecting passage may be utilized instead so as to avoid obstruction of the operator's vision. However, accessories are often attached to the mounting base, and when changing the mounting base, the accessories attached must be removed together with the changed mounting base, thereby causing inconvenience.

SUMMARY

Therefore, an object of the disclosure is to provide a protective cover having a quick-release unit that can alleviate at least one of the drawbacks of the prior art.

According to the disclosure, the protective cover is adapted to be mounted on a table saw and connected to a suction device. The table saw includes a table and a saw blade that extends transversely through a top surface of the table. The protective cover includes a base seat adapted to be mounted on the table, a shell unit, a quick-release unit, and two protective members. The shell unit is adapted to be connected to the suction device, and defines a dust-collecting passage, a dust outlet that is adapted for communicating the dust-collecting passage and the suction device, and a dust inlet that is adapted to be in communication with the dust-collecting passage and that is adapted for facing the saw blade. The quick-release unit is disposed in the shell unit, and includes a main engaging member and an auxiliary engaging member that are spaced apart from each other and that are connected separably to the base seat, and a pull member that is pivotably mounted to the shell unit, and that is connected to the main engaging member. The protective members are pivotably connected to the shell unit and is adapted for covering a portion of the saw blade. The pull member is pivotable between a lock position, where the main engaging member and the auxiliary engaging member are connected to the base seat to secure the shell unit to the base seat, and a release position, where the main engaging member and the auxiliary engaging member are allowed to be separated from the base seat to thereby allow separation of the shell unit, the quick-release unit, and the protective members from the base seat.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
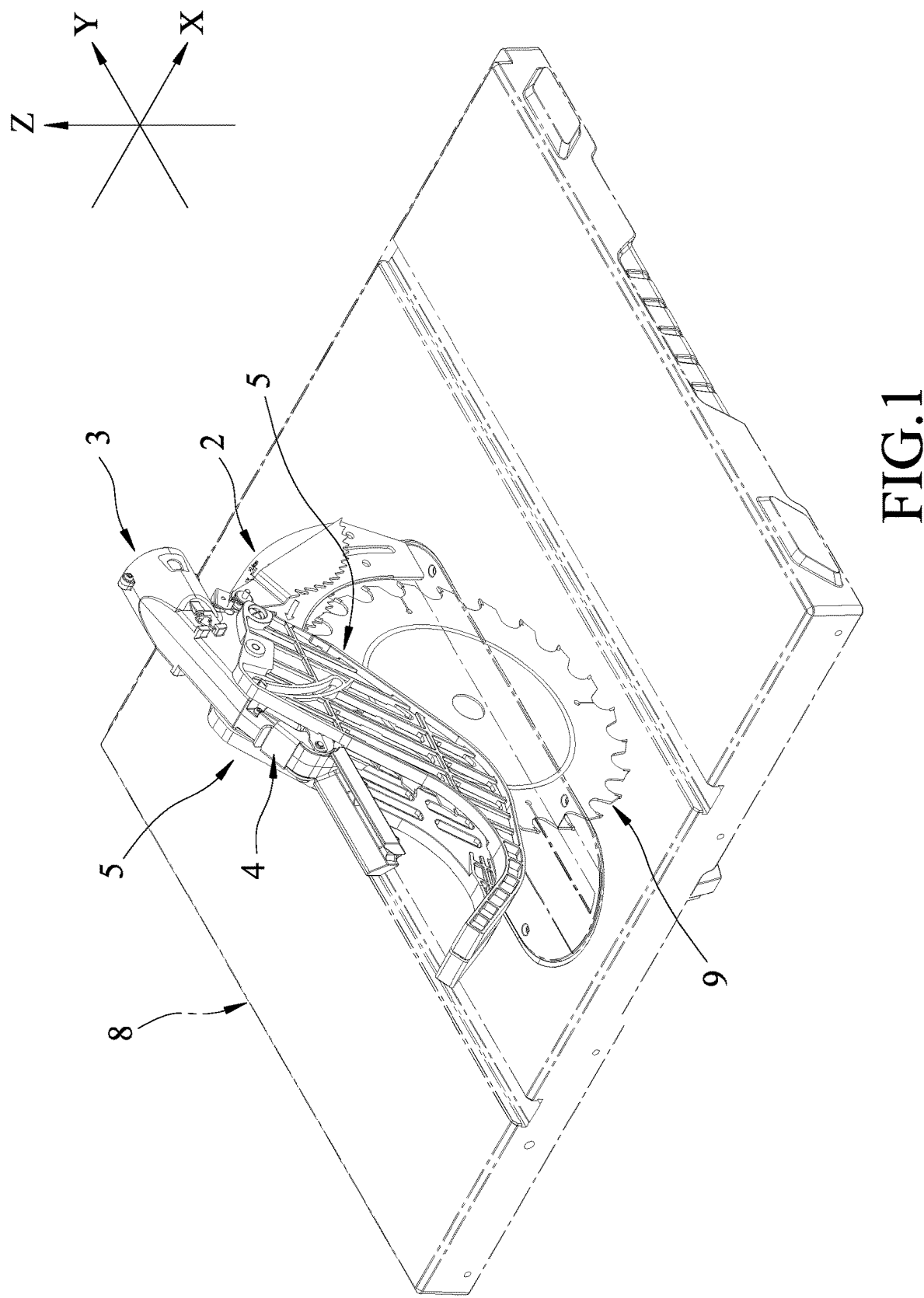
FIG. 1 is a perspective view illustrating an embodiment of the protective cover having a quick-release unit according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
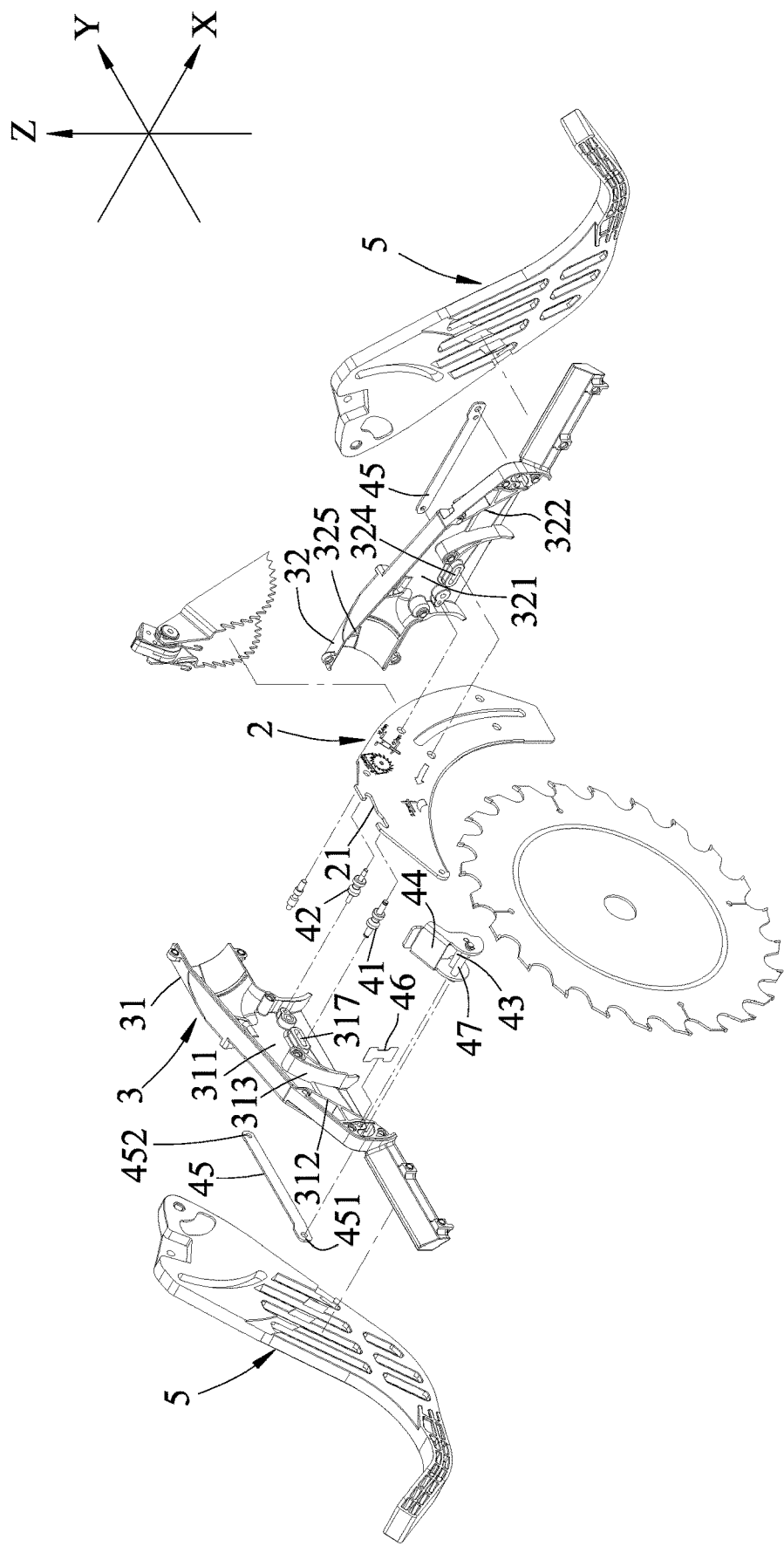
FIG. 2 is an exploded perspective view illustrating the embodiment.
Figure 3:
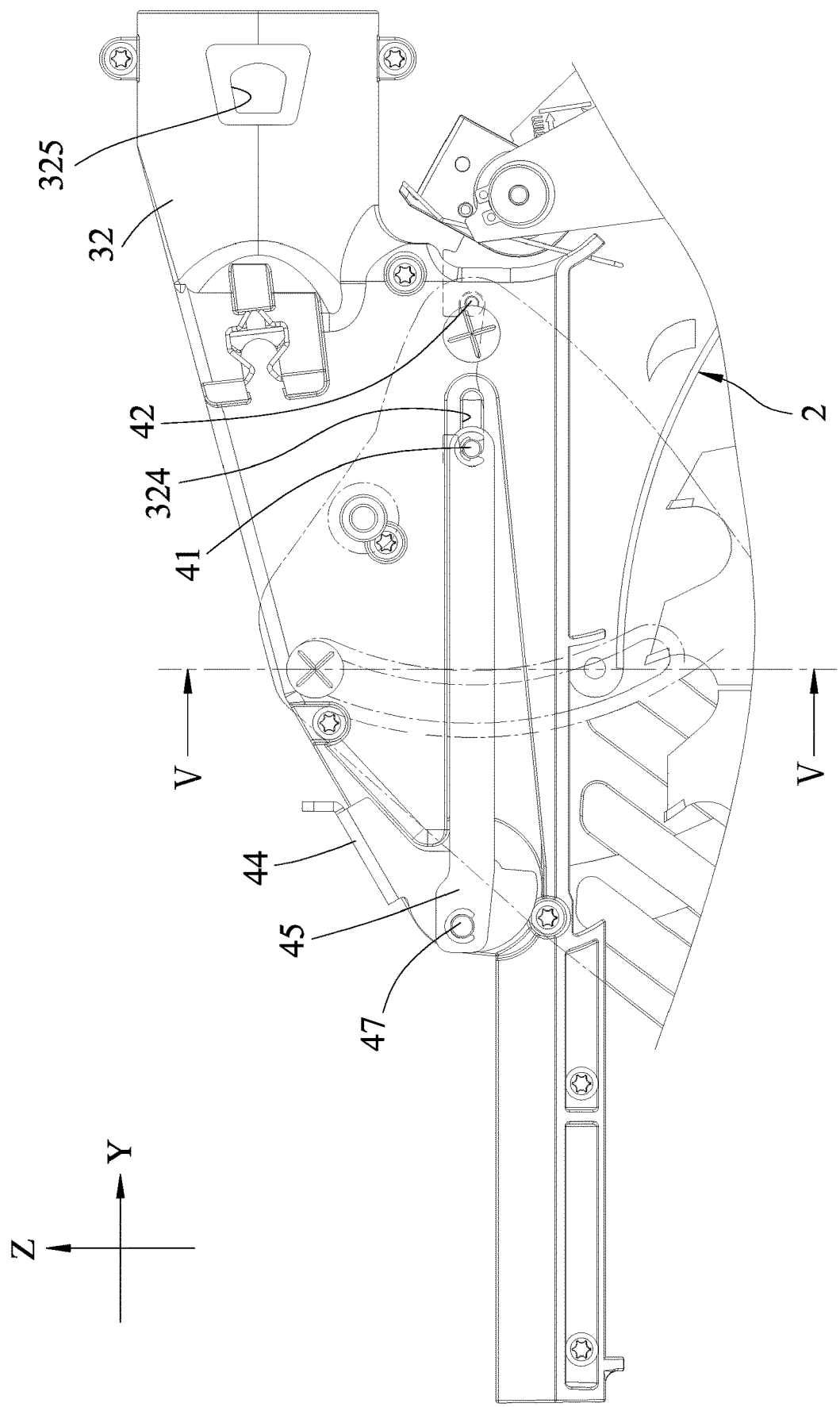
FIG. 3 is a fragmentary side view illustrating a pull member at a lock position.

Referring to FIGS. 1 to 3, an embodiment of the protective cover is adapted to be mounted on a table saw and connected to a suction device (not shown). The table saw includes a table 8, and a saw blade 9 mounted on the table 8 that extends transversely through a top surface of the table 8. The protective cover includes a base seat 2, a shell unit 3, a quick-release unit 4, and two protective members 5.

In this embodiment, the suction device is a vacuum, but in other embodiments, other equivalent suction devices for removing wooden chips and sawdust, like air suction pumps, may be employed.

Figure 4:
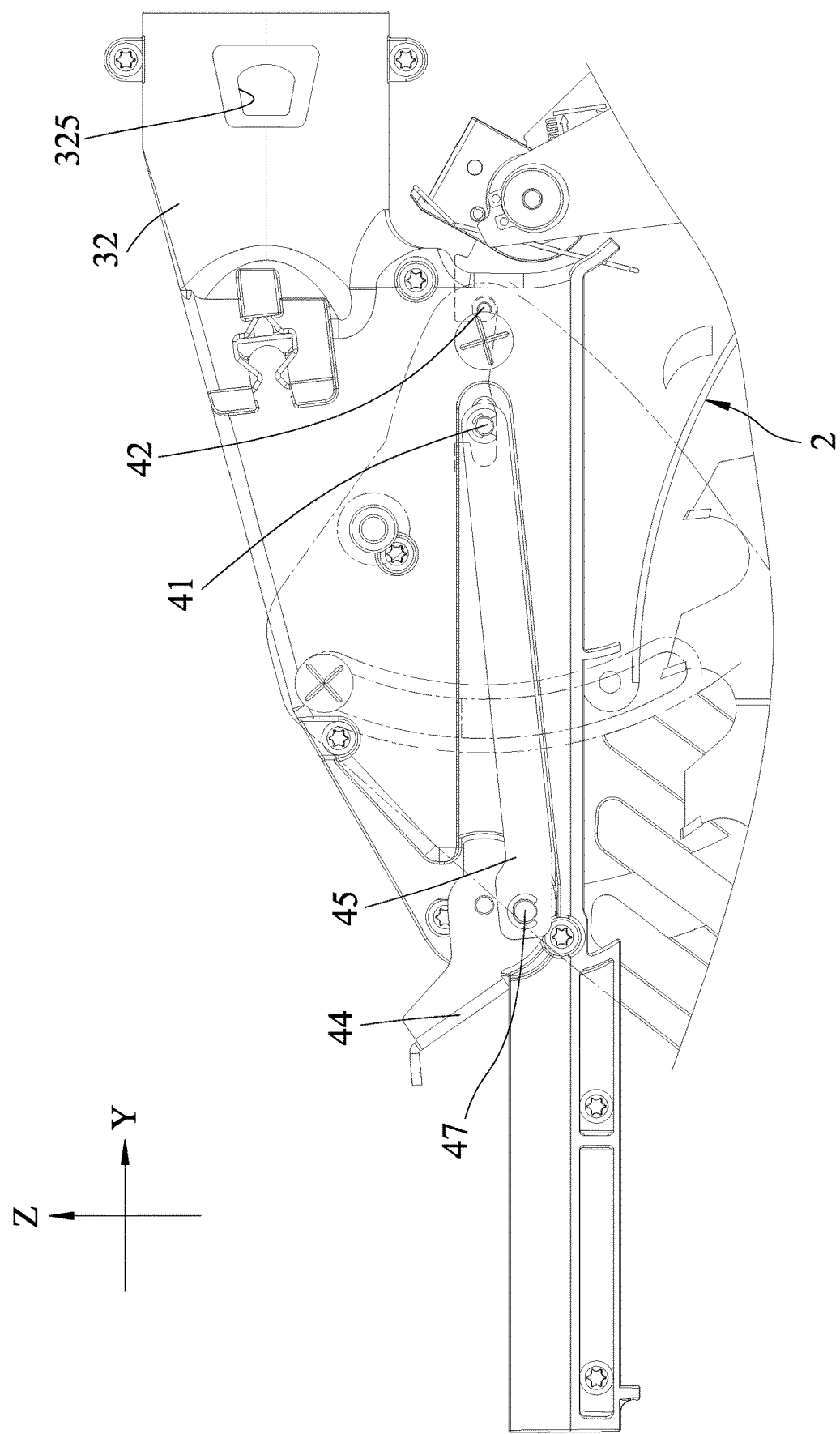
FIG. 4 is a fragmentary side view illustrating the pull member at a release position.
Figure 5:
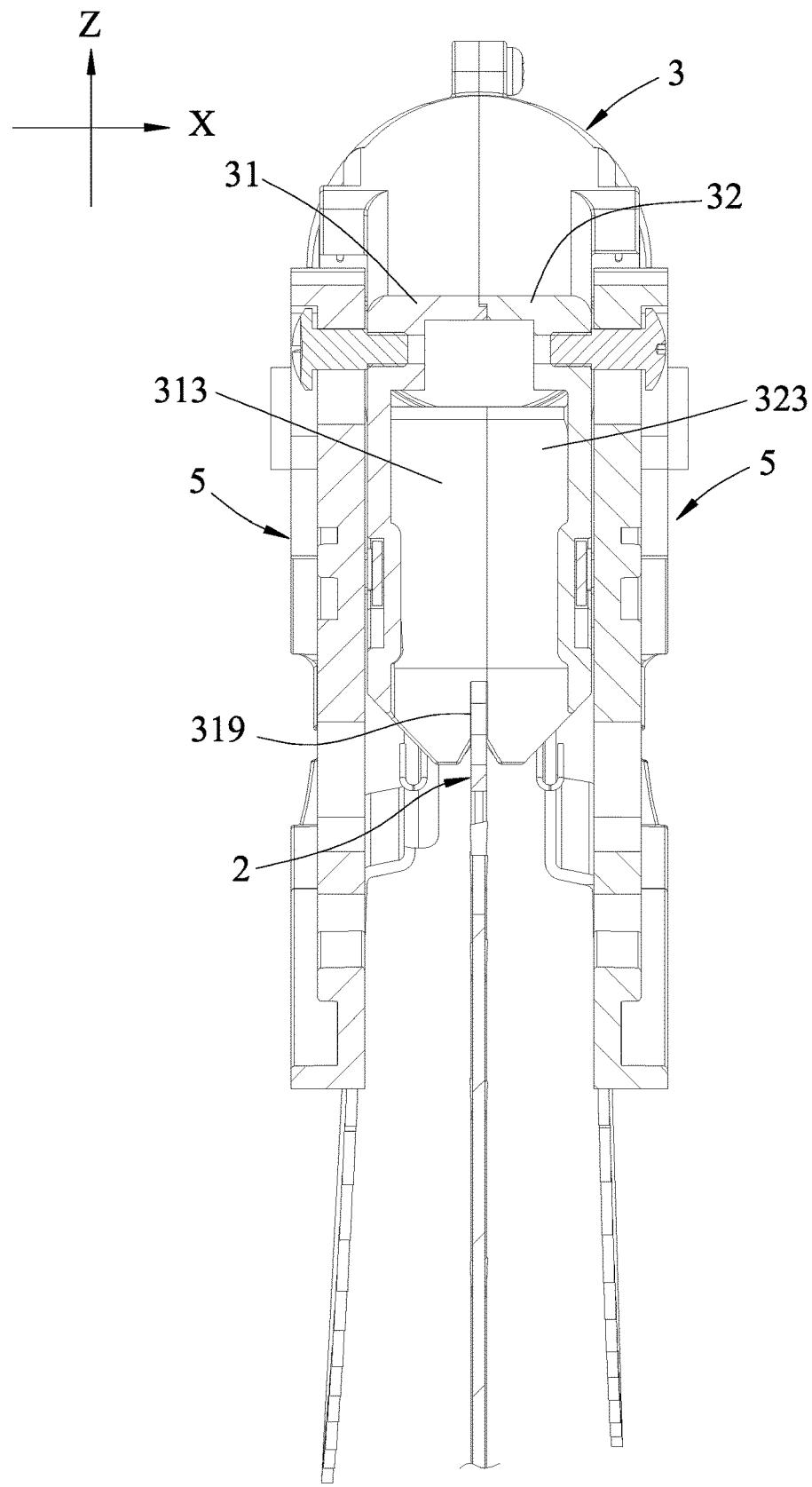
FIG. 5 is a sectional view of the embodiment taken along line V-V in FIG. 3.
Figure 6:
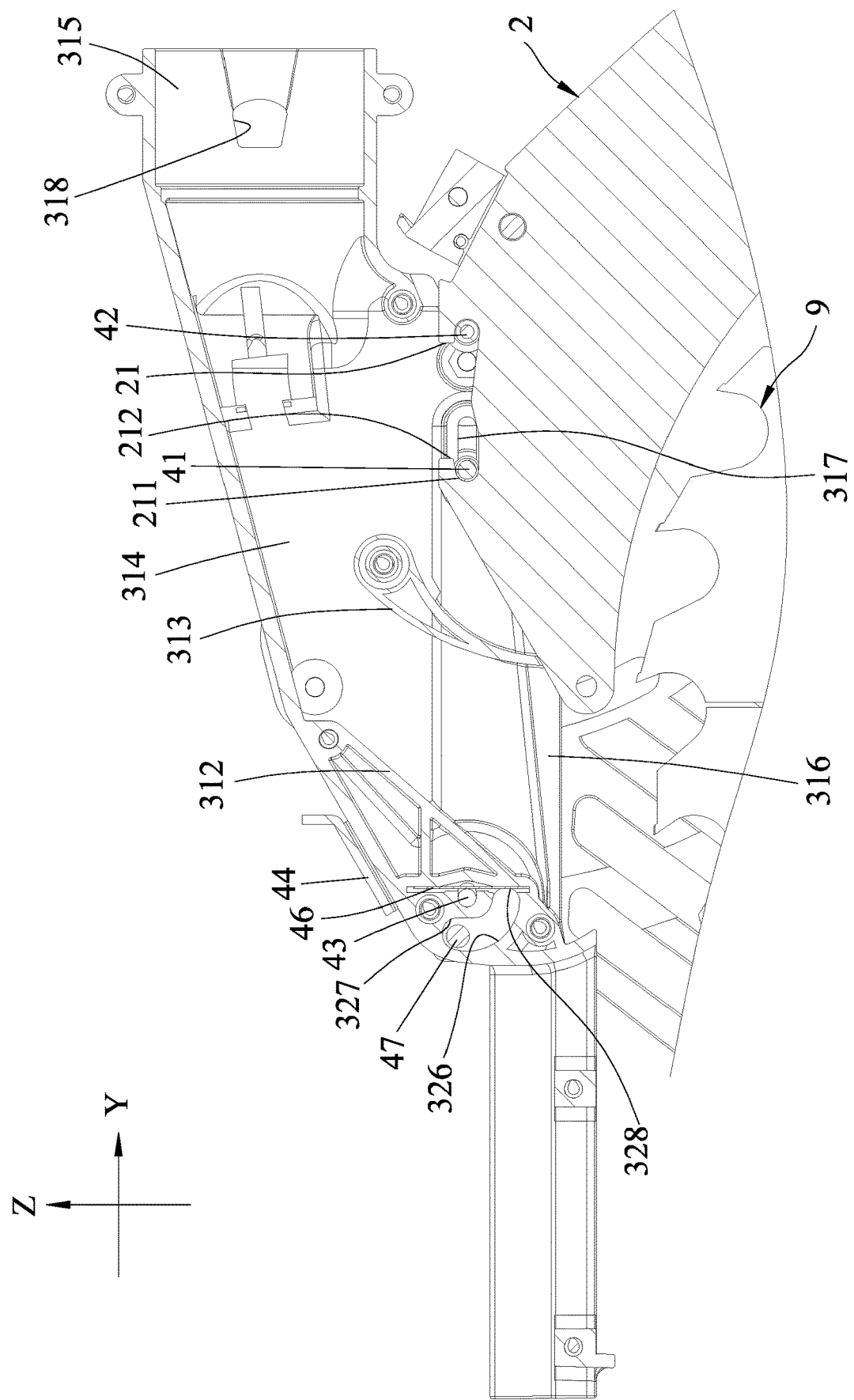
FIG. 6 is a partly sectional view of the embodiment illustrating the pull member at the lock position.
Figure 7:
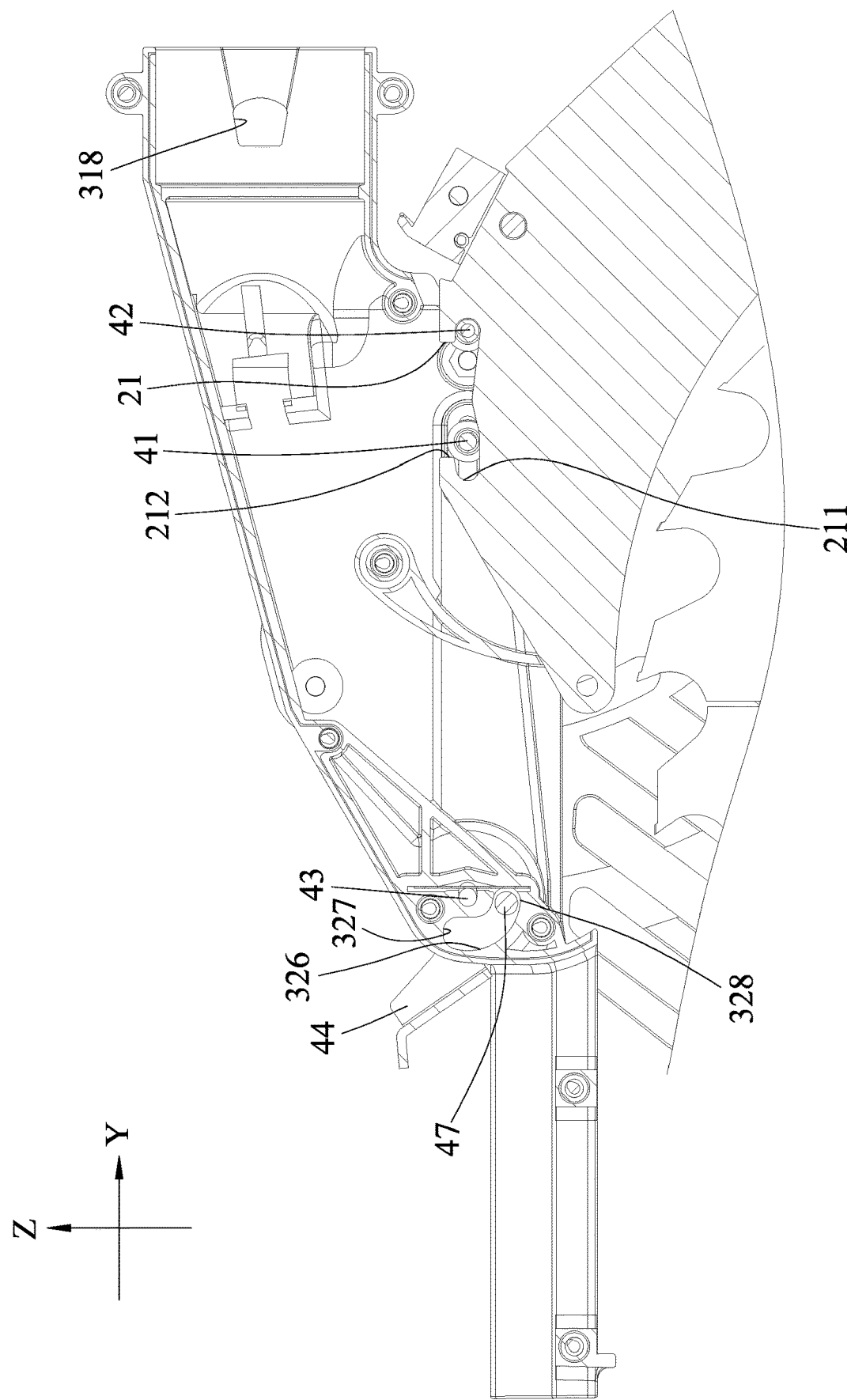
FIG. 7 is a partly sectional view of the embodiment illustrating the pull member at the release position.

Referring further to FIGS. 4 to 6, the base seat 2 is adapted to be mounted on the table 8, and has an engaging groove 21 extending therethrough in a first direction (X). The engaging groove 21 has an engaging portion 211 that is elongated in a second direction (Y) perpendicular to the first direction (X), and an open end portion 212 that extends from the engaging portion 211 to a peripheral edge of the base seat 2, and that has a length in the second direction (Y) smaller than a length of the engaging portion 211 in the second direction (Y).

Referring to FIGS. 2, 5 and 6, the shell unit 3 is adapted to be connected to the suction device, and includes a first shell body 31 and a second shell body 32 separably coupled to each other. The first shell body 31 includes a base wall 311, a guide wall 313 extending from the base wall 311 toward the second shell body 32 and perpendicular to the second direction (Y), and a front wall 312. The guide wall 313 and the front wall 312 are spaced apart from each other in the second direction (Y). The second shell body 32 includes a base wall 321, a guide wall 323 extending from the base wall 321, toward the first shell body 31 and perpendicular to the second direction (Y), and a front wall 322. The guide wall 323 and the front wall 322 are spaced apart from each other in the second direction (Y), The first and second shell bodies 31, 32 cooperatively define a dust-collecting passage 314 for sawdust and wooden chips to pass through, a dust outlet 315 adapted for communicating the dust-collecting passage 314 and the suction device, and a dust inlet 316 adapted to be in communication with the dust-collecting passage 314 and adapted for facing the saw blade 9. Each of the first and second shell bodies 31, 32 further has a linear movement slot 317, 324 being elongated in the second direction (Y) and adapted for interconnecting the dust-collecting passage 314 and the external environment, and a mounting hole 318, 325 extending therethrough in the first direction (X) and being in communication with the dust outlet 315. The shell unit 3 has a pivot movement slot 326 extending through the first and second shell bodies 31, 32 in the first direction (X). The guide walls 313, 323 of the first and second shell bodies 31, 32 abut against each other and cooperatively define a notch 319 engaged removably with the base seat 2. The pivot movement slot 326 has a lock end 327 and a release end 328 opposite to each other. Specifically, the dust inlet 316 is defined among the base walls 311,321, the guide walls 313,323, and the front walls 312,322 of the first and second shell bodies 31, 32, and the guide wall 313,323 of each of the first and second shell bodies 31, 32 extends from the dust inlet 316 towards the dust outlet 315. The suction device may be steadily connected to the shell unit 3 through the mounting holes 318,325, and the wooden chips and sawdust may be guided from the dust inlet 315 to the dust outlet 316 through the guide walls 313,323. The engagement between the base seat 2 and the notch 319 positions the base seat 2 in a steady manner and prevents the base seat 2 from rocking.

The quick-release unit 4 is disposed in the shell unit 3 and includes a main engaging member 41 and an auxiliary engaging member 42 extending in the first direction (X), spaced apart from each other in the second direction (Y), and connected separably to the base seat 2. The quick-release unit 4 further includes a pivot shaft 43 extending in the first direction (X) and mounted in the shell unit 3, a pull member 44 pivotably mounted in the shell unit 3 and connected to the pivot shaft 43, two linking members 45 disposed respectively at opposite sides of the shell body 3 in the first direction (X) and interconnecting the main engaging member 41 and the pull member 44, a resilient member 46 mounted in the shell unit 3 and abutting against the pivot shaft 43, and a guide member 47 extending in the first direction (X) through the pull member 44 and the linking members 45.

Specifically, the main engaging member 41 engages the linear movement slots 317, 324 of the first and second shell bodies 31, 32. The pivot shaft 43 is movable in the second direction (Y), and is spaced apart from the main engaging member 41 in the second direction (Y). Each of the linking members 45 has a driving end 451 connected pivotally to the pull member 44, and a driven end 452 opposite to the driving end 451 and connected pivotally to the main engaging member 41. The guide member 47 extends movably through the pivot movement slot 326 and is spaced apart from the pivot shaft 43, the pivot movement slot 326 is curved and extends around the pivot shaft 43, and the lock end 327 and the release end 328 of the pivot movement slot 326 are disposed respectively at opposite sides of the pivot shaft 43 in a third direction (Z) perpendicular to the first and second directions (X, Y). The resilient member 46 resiliently biases the pivot shaft 43 away from the auxiliary engaging member 42. The quick-release unit 4 includes two linking members 45 in this embodiment, but the number of the linking member 45 may vary in other embodiments. In this embodiment, the resilient member 46 is a spring plate, while in other embodiments, the resilient member 46 may be but is not limited to other equivalent elements that provide resilient force, such as springs. In this embodiment, the first direction (X) is perpendicular to the saw blade 9, the second direction (Y) is parallel to the saw blade 9, and the third direction (Z) extends vertically. In other embodiments, the configurations of the first, second, and third directions (X, Y, Z) may be altered.

Referring to FIGS. 3, 4, 6 and 7, the pull member 44 is pivotable between a lock position (see FIGS. 3 and 6) and a release position (see FIGS. 4 and 7), and in turn drives movement of the linking members 45, the guide member 47, and the main engaging member 41. When the pull member 44 is at the lock position, the main engaging member 41 and the auxiliary engaging member 42 are distanced from each other and disposed in the engaging portion 211 of the engaging groove 21, and a distance between the main engaging member 41 and the auxiliary engaging member 42 in the second direction (Y) is greater than a length of the open end portion 212 in the second direction (Y). At this time, the guide member 47 is adjacent to the lock end 327 of the pivot movement slot 326, the pivot shaft 43 is disposed between the driving end 451 and the driven end 452 in the second direction (Y), and the shell unit 3 is secured to the base seat 2. When the pull member 44 is at the release position, the main engaging member 41 and the auxiliary member 42 are relatively close to each other, the distance between the main engaging member 41 and the auxiliary engaging member 42 in the second direction (Y) is smaller than the length of the open end portion 212 in the second direction (Y). At this time, the guide member 47 is adjacent to the release end 328 of the pivot movement slot 326, and the shell body 3 may be separated from the base seat 2. During movement of the pull member 44 from the release position to the lock position, the guide member 47 is driven by the pull member 44 to move along the pivot movement slot 326 and pass a dead point of the structure, thus preventing erroneous switching of the positions from vibrations.

It should be noted that, during the movement of the pull member 44 from the release position to the lock position, a force toward the main engaging member 41 in the second direction (Y) is applied to the pivot shaft 43, and the pivot shaft 43 is maintained at its original position by the resilient member 46. The presence of the resilient member 46 prevents the pivot shaft 43 from directly contacting the shell body 3, which would otherwise cause wear of the shell body 3 and eventually cause the main engaging member 41 to not be able to firmly engage with the engaging groove 21.

The protective members 5 are pivotably and respectively connected to the first shell body 31 and the second shell body 32, and are adapted for covering a portion of the saw blade 9.

When installing the protective cover, the pull member 44 is first pulled to the release position, and then the main engaging member 31 and the auxiliary engaging member 42 are moved to pass through the open end portion 212 of the engaging groove 21 and enter the engaging portion 211 since the distance between the main engaging member 41 and the auxiliary engaging member 42 in the second direction (Y) is smaller than the length of the open end portion 212 in the second direction (Y). Next, the pull member 44 is pulled to the lock position, during which the main engaging member 41 is moved away from the auxiliary engaging member 42 until the distance between the main engaging member 41 and the auxiliary engaging member 42 in the second direction (Y) is greater than the length of the open end portion 212 in the second direction (Y), so that the main engaging member 41 and auxiliary engaging member 42 are secured to the base seat 2 and that the shell member 3 is firmly secured to the base seat 2. Then, the suction device is connected to the dust outlet 315. During operation of the table saw, the wooden chips and sawdust may be extracted by the suction device, and the protective members 5 prevent the wooden chips and sawdust from sputtering. If the protective cover is not needed, after pulling the pull member 44 from the lock position to the release position, the main engaging member 41 is moved toward the auxiliary engaging member 42, and the quick-release member 4, along with the shell member 3, and the protective members 5 may be separated from the base seat 2.

Compared to conventional protective cover, a user may quickly secure the shell body 3 the base seat 2 or separate the shell body 3 from the base seat 2 by simply moving the pull member 44, without dismounting the base seat 2 and the accessories attached, thereby providing a convenient usage. Furthermore, the resilient member 46 abuts against the pivot shaft 43, and resiliently biases the pivot shaft 43 away from the auxiliary engaging member 42, thereby ensuring the main engaging member 41 to be securely engaged with the engaging portion 211 when the pull member 44 is at the lock position after long term use of the protective cover.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A protective cover adapted to be mounted on a table saw and connected to a suction device, the table saw including a table and a saw blade that extends transversely through a top surface of the table, said protective cover comprising:
    a base seat adapted to be mounted on the table;
    a shell unit adapted to be connected to the suction device, and defining a dust-collecting passage, a dust outlet that is adapted for communicating said dust-collecting passage and the suction device, and a dust inlet that is adapted to be in communication with said dust-collecting passage and that is adapted for facing the saw blade;
    a quick-release unit disposed in said shell unit, and including
        a main engaging member and an auxiliary engaging member that are spaced apart from each other and that are connected separably to said base seat, and
        a pull member that is pivotably mounted to said shell unit, and that is connected to said main engaging member; and
    two protective members pivotably connected to said shell unit and adapted for covering a portion of the saw blade;
    wherein said pull member is pivotable between a lock position, where said main engaging member and said auxiliary engaging member are connected to said base seat to secure said shell unit to said base seat, and a release position, where said main engaging member and said auxiliary engaging member are allowed to be separated from said base seat to thereby allow separation of said shell unit, said quick-release unit and said protective members from said base seat.

2. The protective cover as claimed in claim 1, wherein:
    said base seat has an engaging groove extending therethrough in a first direction, and having
        an engaging portion that is elongated in a second direction perpendicular to the first direction, and
        an open end portion that extends from said engaging portion to a peripheral edge of said base seat, and that has a length in the second direction smaller than a length of said engaging portion in the second direction;
    said main engaging member and said auxiliary engaging member extend in the first direction and are spaced apart from each other in the second direction;
    when said pull member is at the lock position, said main engaging member and said auxiliary engaging member are disposed in said engaging portion of said engaging groove, and a distance between said main engaging member and said auxiliary engaging member in the second direction is greater than the length of said open end portion in the second direction; and when said pull member is at the release position, the distance between said main engaging member and said auxiliary engaging member in the second direction is smaller than the length of said open end portion in the second direction.

3. The protective cover as claimed in claim 2, wherein:
said shell unit includes a first shell body and a second shell body that are separably coupled to each other, and that cooperatively define said dust-collecting passage, said dust outlet, and said dust inlet;
each of said first shell body and said second shell body has a base wall,
a guide wall extending from said base wall toward the other one of said first shell body and said second shell body, and being perpendicular to the second direction, and
a front wall, said guide wall and said front wall being spaced apart from each other in the second direction;
said guide walls of said first shell body and said second shell body cooperatively define a notch engaged removably with said base seat;
said dust inlet is defined among said base walls, said guide walls and said front walls of said first shell body and said second shell body; and
said guide wall of each of said first shell body and said second shell body extends from said dust inlet toward said dust outlet.

4. The protective cover as claimed in claim 3, wherein:
each of said first shell body and said second shell body further has a linear movement slot being elongated in the second direction and adapted for interconnecting said dust-collecting passage and an external environment; and
said main engaging member engages said linear movement slots of said first shell body and said second shell body.

5. The protective cover as claimed in claim 2, wherein said quick-release unit further includes:
a pivot shaft mounted in said shell unit, connected to said pull member, and serving as a pivot of said pull member; and
at least one linking member interconnecting said pull member and said main engaging member.

6. The protective cover as claimed in claim 5, wherein said quick-release unit further includes a resilient member mounted in said shell unit, abutting against said pivot shaft, and resiliently biasing said pivot shaft away from said auxiliary engaging member.

7. The protective cover as claimed in claim 5, wherein:
said shell unit has a pivot movement slot extending therethrough in the first direction; and
said quick-release unit further includes a guide member extending in the first direction through said pull member and said at least one linking member, spaced apart from said pivot shaft, and extending movably through said pivot movement slot.

8. The protective cover as claimed in claim 7, wherein:
said pivot movement slot has a lock end and a release end opposite to each other;
when said pull member is at the lock position, said guide member is adjacent to said lock end of said pivot movement slot; and
when said pull member is at the release position, said guide member is adjacent to said release end of said pivot movement slot.

9. The protective cover as claimed in claim 8, wherein:
said pivot shaft and said main engaging member are spaced apart from each other in the second direction; and
said lock end and said release end of said pivot movement slot are disposed respectively at opposite sides of said pivot shaft in a third direction perpendicular to the first and second directions.

10. The protective cover as claimed in claim 7, wherein:
said at least one linking member has a driving end connected pivotally to said pull member, and a driven end opposite to said driving end and connected pivotally to said main engaging member; and
when said pull member is at the lock position, said pivot shaft is disposed between said driving end and said driven end in the second direction.

* * * * *